United States Patent [19]

Hall et al.

[11] Patent Number: 4,994,840

[45] Date of Patent: Feb. 19, 1991

[54] APPARATUS FOR PROCESSING PHOTOSENSITIVE MATERIAL

[75] Inventors: Douglas O. Hall, Canadaigua; Bruce R. Muller, Rochester, both of N.Y.

[73] Assignee: Eastman Kodak Company, Rochester, N.Y.

[21] Appl. No.: 495,671

[22] Filed: Mar. 16, 1990

[51] Int. Cl.[5] .............................................. G03B 3/06

[52] U.S. Cl. .................................... 354/324; 354/322

[58] Field of Search ............... 354/320, 321, 322, 324, 354/317, 328, 319; 134/122 P

[56] References Cited

U.S. PATENT DOCUMENTS

| | | | |
|---|---|---|---|
| 3,192,846 | 7/1965 | Wright | 134/122 P |
| 3,372,630 | 3/1968 | Schmidt | 354/328 |
| 3,688,677 | 9/1972 | Frick et al. | 134/122 P |
| 3,988,756 | 10/1976 | Wick et al. | 354/319 |
| 4,688,917 | 8/1987 | Muller et al. | 354/324 |
| 4,758,857 | 7/1988 | Tanaka | 354/320 |

*Primary Examiner*—A. A. Mathews

*Attorney, Agent, or Firm*—G. Herman Childress

[57] ABSTRACT

Factors affecting the quality of the development of a photosensitive material include the characteristics of a processing fluid flow in contact with the material. A uniform turbulent fluid flow is created in a photographic processing apparatus by utilizing the height of the fluid in a tank for retaining the processing fluid. The height of the fluid creates a fluid pressure which is utilized in determining the flowrate of the fluid in the processing apparatus. An uncomplicated, low friction fluid flow is also created which allows for a more efficient, lower cost photographic processing apparatus.

7 Claims, 4 Drawing Sheets

APPARATUS FOR PROCESSING PHOTOSENSITIVE MATERIAL

FIELD OF THE INVENTION

The subject invention relates to a photographic processing apparatus for processing a strip or sheet of photosensitive material.

BACKGROUND OF THE INVENTION

Manufacturers of photographic processing equipment are continually striving to attain rapid and accurate processing of photographic materials. This equipment should be easily manufactured, reliable and economical This involves simplifying the design and/or reducing the physical size of various elements in the processor. This further entails reducing the number of unnecessary elements of the processor. These factors put together can substantially reduce the cost of manufacturing the processor. Reducing the energy requirements for motors and pumps used in the processor can further reduce the cost of operating the processor.

Furthermore, the photofinishers endeavor to produce highly accurate images with higher contrasts. High quality images are difficult to achieve when photosensitive materials are processed using the conventional rack and tank processors. The racks include a plurality of driven rollers which produce "noise" on the photosensitive material. The "noise", which can appear as scratches or dirt on the material generally occur as a result of the material coming in contact with elements of the transport system of the processor such as the rollers. Unwanted sensitized areas of an emulsion of the material are also sometimes referred to as "noise" on the material. These unwanted sensitized areas can be a result of the emulsion being exposed to high contact pressures during the time the photosensitive material is traveling through the processing fluid. Also, excess processing fluid which can collect on parts of the transport system of the processor can drip onto the material as it travels through the processor possibly causing differentially sensitized areas in the emulsion.

One type of photographic processor which attempts to minimize manufacturing cost and the above disadvantages includes at least one nozzle for supplying fluid to a photosensitive material for photographically processing the material. The nozzle may have a complex configuration to provide a turbulent fluid flow for processing the material. A complex nozzle design such as that disclosed in co-pending and commonly assigned patent application U.S. Ser. No. 426,349 by Douglas O. Hall et al. may require the processor to include a high power consumption pump. The slot-nozzle disclosed in U.S. Ser. No. 426,349 is configured to convert a cylindrical fluid flow to a long thin fluid flow, hence possibly requiring a fluid supply pump having higher energy requirements at a greater cost to the manufacturer.

SUMMARY OF THE INVENTION

The present invention is directed to a photographic processing apparatus which is reliable and economical to manufacture and operate. This processor can produce highly accurate images in a substantially brief time period. Furthermore, the processor of the present invention nearly eliminates induced "noise" and unwanted sensitized areas of an emulsion. Because the designs of a portion of the elements of the photographic processing unit of the present invention are simplified and elements normally incorporated in conventional photographic processors are eliminated, the photographic processing unit of the present invention has greater reliability at a lower manufacturing cost.

The processing unit of the present invention includes a means for supplying a processing fluid to a predetermined height in a vessel having the capability to retain the processing fluid. The processing unit further includes a processing device having means forming a chamber to permit the material to travel therethrough. The processing unit is submersed in the fluid contained in the vessel. The processing unit also includes at least one inlet for allowing the fluid to flow from the vessel to the chamber. The height of the fluid creates a predetermined fluid pressure which causes fluid to flow in the inlet and through the chamber. A turbulent fluid flow is created in the chamber for processing the photosensitive material as the material travels through the chamber.

BRIEF DESCRIPTION OF THE DRAWINGS

Other advantages of the invention will become apparent from the following description taken in connection with the accompanying drawings wherein:

FIG. 3 is a view of various conduits.

DETAILED DESCRIPTION OF THE INVENTION

Figure 1:
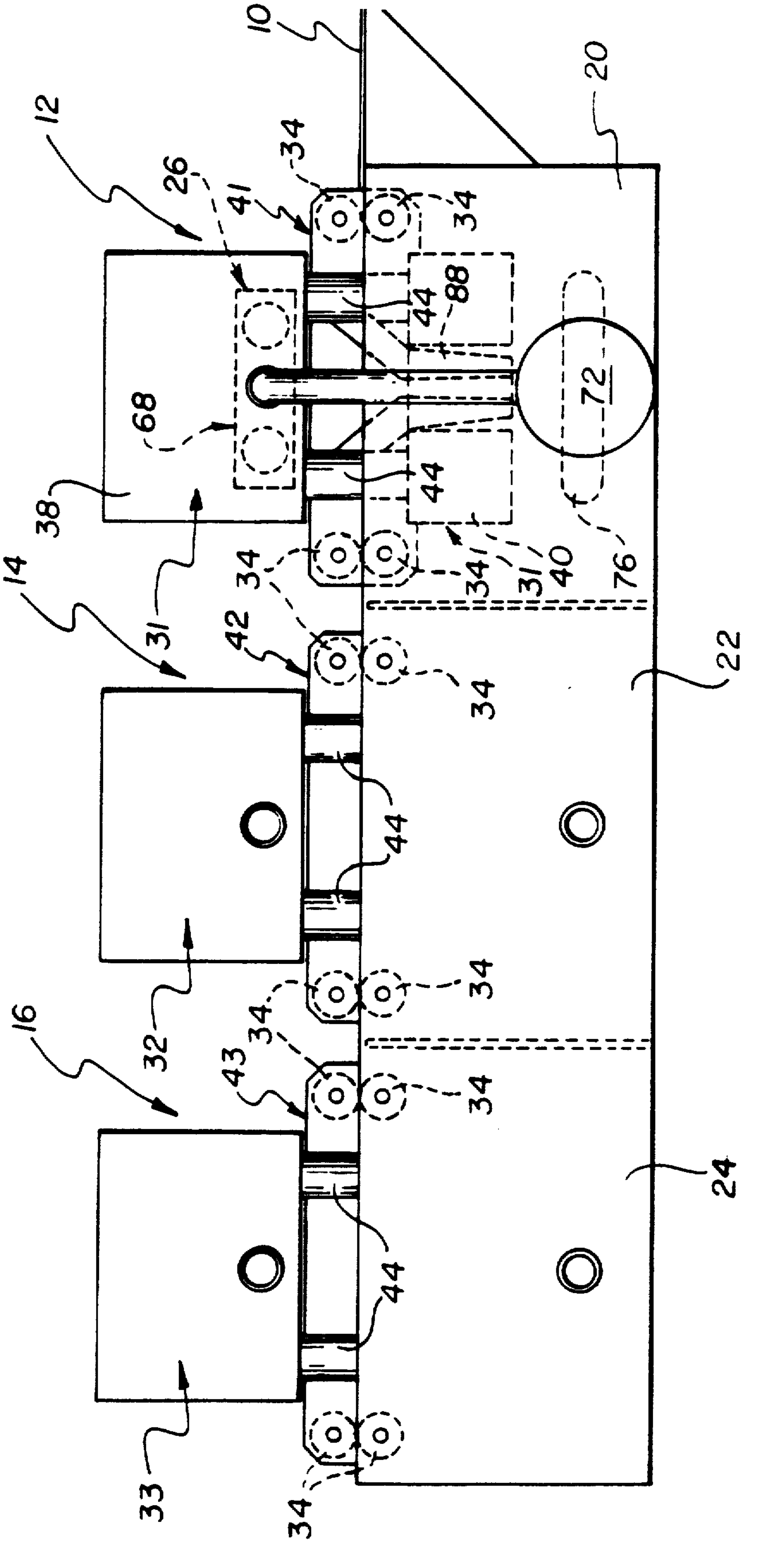
FIG. 1 is a side view of a photographic processing apparatus in accordance with the invention.

Because photographic processors and the general operations associated therewith are well known in the art, the description hereinafter will be directed in particular only to those processor parts relevant to the present invention. It is to be understood, however, that processor components not specifically shown or described may take various forms selectable from those known in the art.

Referring now to the drawings, a photographic processing apparatus for processing a strip or sheet of photosensitive material 10 (film or paper) is shown. The photographic processing apparatus includes a plurality of photographic Processing units 12,14,16 having a processing fluid 18 supplied thereto. The fluid 18 is generally in a liquid form including such photographic processing liquids as developer, fixer, bleach, rinsing fluid, water or any other fluids for use in the processing of photosensitive materials. It should be noted at this point that some of the elements of the processing apparatus should be constructed of corrosion resistant materials due to the corrosive characteristics of some of the above noted fluids. It should be obvious to one skilled in the art that any number of photographic processing units can be included in the photographic processing apparatus depending on the number of processing fluids required for processing a specific photosensitive material.

A plurality of sump tanks 20,22,24 for retaining the fluid 18 are associated with the photographic processing units 12,14,16 respectively. The sump tanks 20,22,24 can be one contiguous tank divided into sections as shown in FIG. 1 or the sump tank can include separate tanks, each section or tank retaining the fluid 18. The photographic processing units 12,14,16 include vessels 31,32,33 respectively and processing devices 41,42,43 respectively. Also associated with each photographic processing unit 12,14,16 is a means for supplying fluid 26 for supplying fluid 18 to the vessels from the sump tanks. The means for supplying fluid 26 is shown in relation to the processing unit 12 only for the sake of simplifying the drawing.

The film 10 is conveyed through the photographic processing apparatus by a plurality of pairs of nip rollers 34 located on opposite sides of the photographic processing units 12,14,16. The nip rollers 34 can be constructed from a resilient material such as rubber or foam rubber and the like which are typically used in conventional photographic processors. In this manner the rollers 34 can be assembled such that the rubber compresses and excess fluid 18 is removed from the film 10 using a squeegee action as the film 10 travels between the photographic processing units 12,14,16. The rollers can be driven by any conventional drive means (not shown).

The photographic processing units 14,16 are similar in construction to the photographic processing unit 12, therefore only processing unit 12 will be described in detail.

Figure 2:
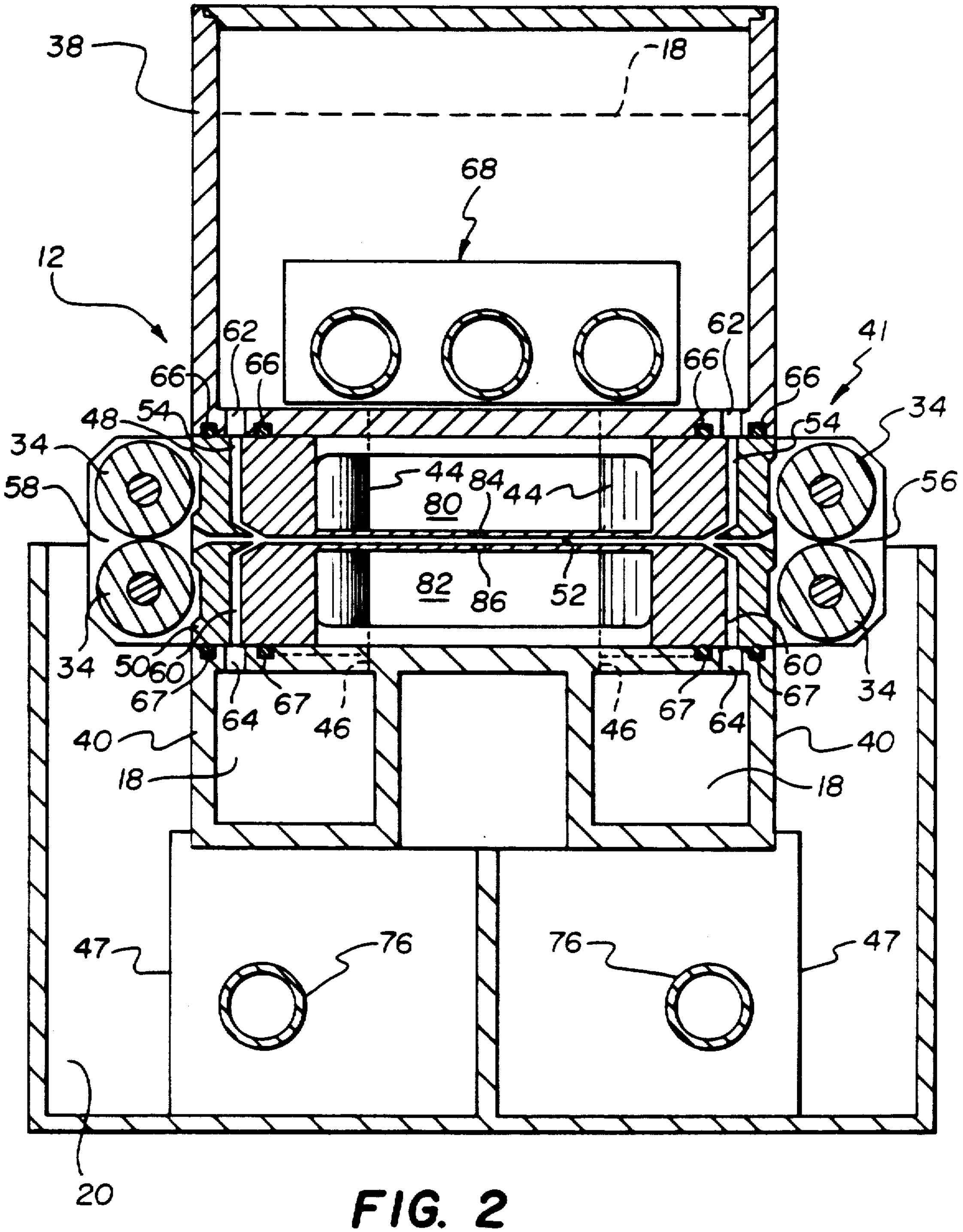
FIG. 2 is a cross section of a photographic processing unit.

The vessel 31 associated with the photographic processing unit 12 will be described referring to FIG. 2. The vessel 31 comprises an upper tank 38 and a lower tank 40. The upper tank 38 has a plurality of first orifices 44 which mate with a plurality of second orifices 46 in the lower tank 40 when the photographic processing unit 12 is assembled. The first and second orifices 44,46 allow the fluid 18 to flow freely between the upper tank 38 and the lower tank 40 The upper tank 38 is supported by the lower tank 40 which is supported by a plurality of legs 47. The bottom of legs 47 are adjacent to the bottom wall of the sump tank 20. Of course, any conventional means of support can be used to support the tanks.

The processing device 41, sometimes referred to as a fluid suspension processor, is located between the upper tank 38 and the lower tank 40 in this embodiment. The device 41 includes a first or upper applicator housing 48 and a second or lower applicator housing 50 located so as to define a fluid chamber 52 for the film 10 to travel through the processing device 41 during processing of the film 10. In the preferred embodiment the distance between the upper and lower applicator housings 48,50 should be at least as large as the thickness of the film 10 plus the desired fluid layer thickness. Generally, the distance can be very small. Fluid 18 enters the chamber 52 through an inlet 54 formed in the upper applicator housing 48. In this embodiment the inlet 54 comprises two elongated slots which are located proximate an entrance end 56 and an exit end 58 respectively of the fluid chamber 52. The fluid 18 also enters the chamber 52 through an inlet 60 formed in the lower applicator housing 50. In this embodiment the inlet 60 comprises two elongated slots which are located near the entrance and exit ends 56,58 respectively of the fluid chamber 52. Thus, it can be seen from the above description of the processing device 41 that fluid 18 enters the chamber 52 such that an upper layer of fluid and a lower layer of fluid are formed on opposite sides of the film 10. The fluid layers on opposite sides of the film are advantageous for a photosensitive material having an emulsion layer on both sides because the suspension of the film 10 between the upper and lower layers of the fluid 18 allows the film 10 to travel through the chamber 52 with a minimum possibility of the emulsion layers of the film 10 getting scratched or marred during processing. A processing device does not have to have inlets in both the upper and lower applicator housings when used in a photographic processing apparatus for processing photosensitive material having an emulsion layer on one side, instead there can be an inlet in only one of the applicator housings. One skilled in the art should realize that the inlets can take a form other than the elongated slot shape and that any number of inlets can be formed in the applicator housings The upper tank 38 further includes a slit 62 formed in the lower wall which meets with each of the slots 54 in the upper applicator housing 48 when the photographic processing unit 12 is assembled. Likewise, the lower tank 40 has a slit 64 formed in the upper wall which meets with each of the slots 60 in the lower applicator housing 50. The slit 62 permits fluid 18 to flow between the upper tank 38 and the chamber 52 and the slit 64 allows fluid to flow between the lower tank 40 and the chamber 52. Accordingly, the processing device 41 is essentially submersed in the fluid 18 in the vessel 31.

According to the preferred embodiment, one or more o-rings 66, formed from rubber or foam or other compressible material, are located between the upper tank 38 and the upper applicator housing 48 and one or more o-rings 67 are located between the lower tank 40 and the lower applicator housing 50 to prevent the fluid 18 from leaking through the sides of the photographic processing unit 12. The upper tank 38 can also include a cover (not shown) to prevent air and/or dust or dirt from mixing with and contaminating the fluid 18.

The fluid 18 is supplied to the upper tank 38 through the supply means 26 from the sump tank 20, as mentioned previously. The supply means 26 shown in FIG. 1 and 2 includes a conduit 68, having either a rectangular or cylindrical shape, located inside the upper tank 38. The conduit 68 is positioned near the bottom wall of the upper tank 38 in this embodiment to achieve and maintain a laminar fluid flow in the upper tank 38. A laminar fluid flow in the upper tank 38 is desirable to eliminate the possibility of aerating the fluid 18 in the upper tank 38 during processing of the film 10. The efficiency of some of the processing fluids 18 mentioned previously will begin to decrease if the fluid 18 is exposed to the circulation of air. Laminar fluid flow is also desirable in the lower tank 40 and the sump tank 20 for the same reason.

Figure 3A:
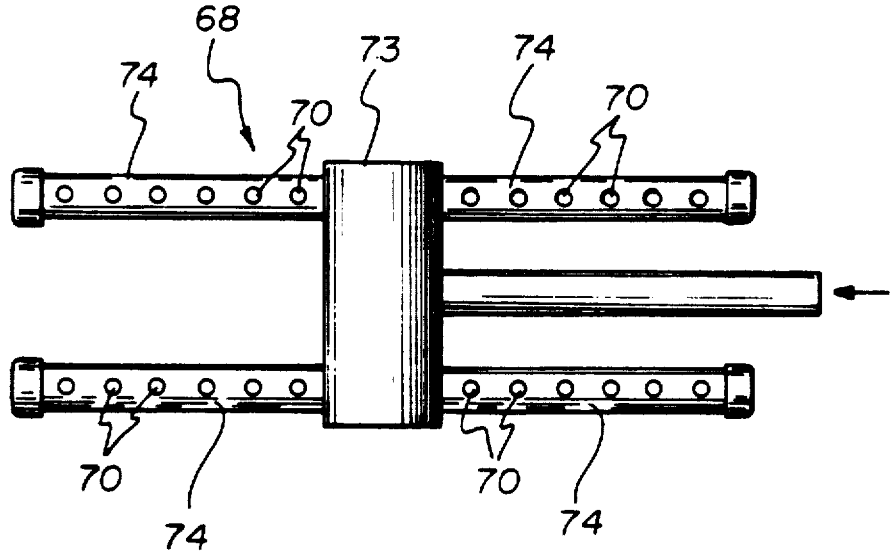
FIG. 3A is a preferred embodiment of the conduit and FIG. 3B is an alternative embodiment of the conduit.
Figure 3B:
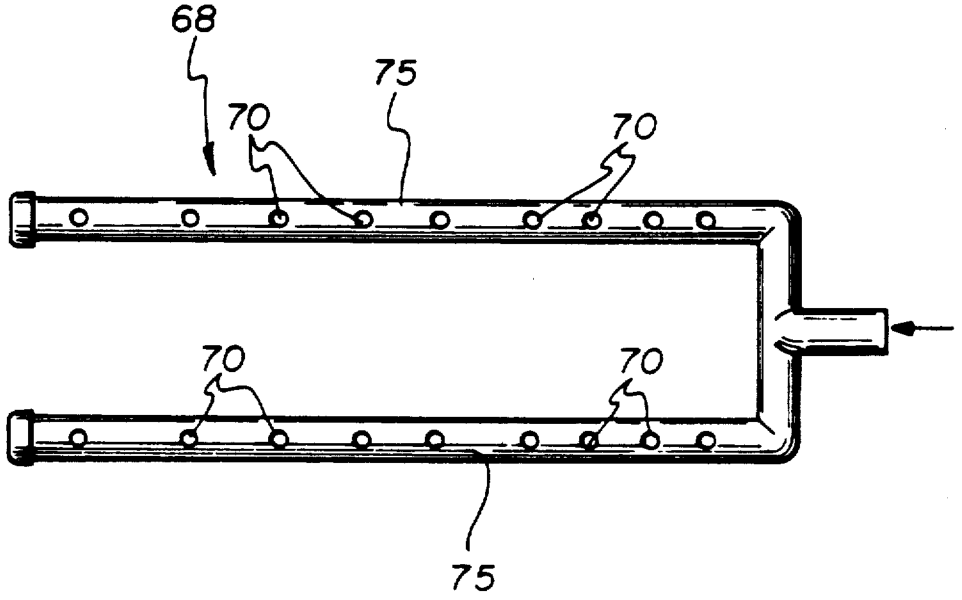
Figure 4:
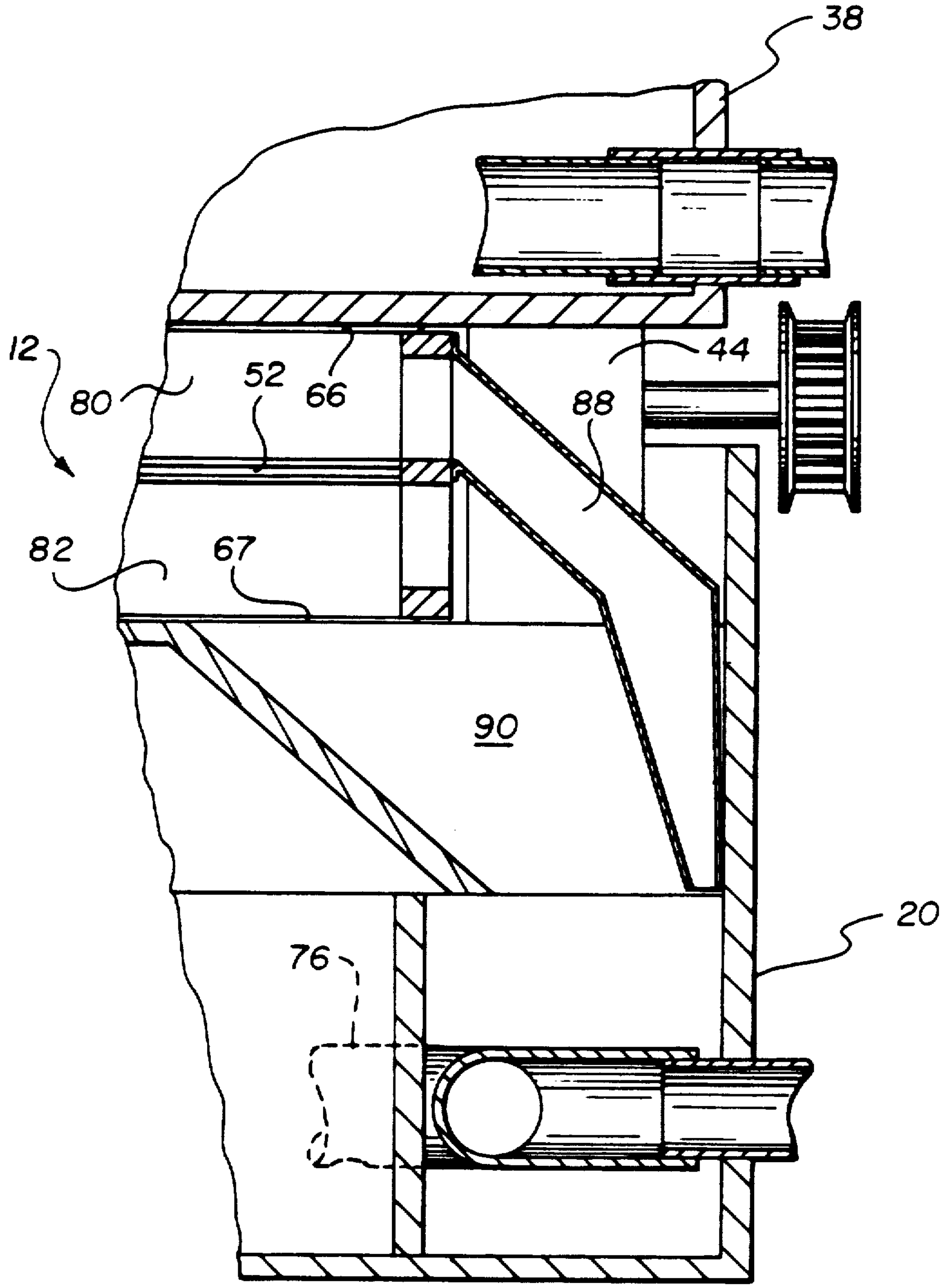
FIG. 4 is an elevational view, in section taken along the line 4—4 in FIG. 1 showing a chute arrangement.

The conduit 68 having a plurality of openings 70 (FIG. 3) should be adapted to attain laminar fluid flow from the conduit 68 through the openings 70 to the upper tank 38. Examples of suitable conduit designs are shown in FIG. 3. As can be seen from the figures the spacing between the openings 70 depends upon the manner in which the fluid is distributed through the conduit from a pump 72. In FIG. 3A the fluid 18 is fed to a centralized pipe 73 and then to elongated tubes 74 extending from the pipe 73. In this design the openings 70 are equally spaced along the length of the tubes 74. FIG. 3B shows the fluid 18 being pumped into the end of a tube 75 and the spacing between the openings 70 being unequal. It will be obvious to those skilled in the art that other conduit designs are possible. In addition to the spacing of the openings 70, the sum of the areas of the openings 70 should be larger than the area of the cross section of the conduit 68 to maintain the desired laminar fluid flow.

A means (not shown) for controlling the temperature of the fluid can be included anywhere along the supply means 26 between the sump tank and the vessel.

The pump 72 can be situated either submersed in the fluid 18 in the sump tank 20 or external to the fluid 18. The pump 72 regulates the flow of the fluid 18 into the vessel 31 so that the fluid 18 will reach a predetermined height above a datum surface. The datum surface in this embodiment corresponds with the bottom wall of the upper tank 38. A level sensor (not shown) can be included to detect the predetermined height of the fluid 18 which can then control the pump 72. The height of the fluid 18 creates a fluid pressure in the vessel 31 which determines the flowrate of the fluid 18 in the chamber 52 of the processing device 41.

At this time the slots 54 and 60 will be described in more detail referring to FIG. 2. The slot 54 is designed such that the laminar fluid flow of the upper tank 38 is converted to a uniform turbulent fluid flow in the fluid chamber 52 to provide uniform processing of the film 10 as the film 10 travels through the chamber 52. Also, slot 60 is designed such that the laminar fluid flow in the lower tank 40 is converted to a uniform turbulent fluid flow in the fluid chamber 52. This conversion is achieved by an abrupt change in the cross sectional area in which the fluid is flowing. In the study of fluid flow it is known that a change of flow cross section results in a change of velocity of the fluid. In the preferred embodiment the change in flow cross section occurs at the slots 54 and 60. The abrupt change of cross sectional area between the upper tank 38 and the chamber 52 helps in creating the turbulent fluid flow desired in the chamber 52 by increasing the velocity of the fluid. A polished matte finish on the surfaces of the applicator housings further enhances and maintains the uniform turbulent fluid flow.

The equations of fluid dynamics can be applied to determine the flowrate of the fluid as the fluid 18 leaves the slot 54 and enters the chamber 52. Furthermore, the equations of fluid dynamics will reveal the relationship between the height of the fluid in the vessel 31 and the turbulent fluid flow in the chamber 52. The fundamentals of fluid dynamics teaches that fluid flowrate is a function of the cross sectional area in which the fluid flows and the fluid velocity. Accordingly, the following equation can be derived:

$$Q=AV=(Ha^3b)/(12\ uL)$$

where:

Q is the mass flow rate of the fluid in cubic feet per second;

A is the cross sectional area of the slot in square feet;

V is the fluid velocity in feet per second;

H is the fluid head height in pounds per square feet;

a is the slot gap in feet;

b is the slot width in feet;

u is the fluid viscosity in pound seconds per square feet;

L is the slot length in feet.

The flowrate of the fluid in the chamber 52 can be determined by substituting the slot dimensions with the dimensions of the chamber 52 in the above equation.

As known to those skilled in the art the fluid pressure in a system remains constant along a horizontal plane. Therefore, the flowrate of the fluid exiting each slot 54 is the same. Furthermore, since the distance between the upper and lower housings 48,50 is very small compared to the vertical distance of the fluid in the vessel 31 the flowrate of the fluid leaving slot 60 is equal to the flowrate of the fluid exiting slot 54 provided the slots 54,60 are similar in construction.

From the above description of the fluid flow path it can be seen that the pump 72 can be smaller in size than a pump incorporated in a conventional photographic processor due to the uncomplicated slot design and fluid flow path. The straight lines of the slot 54 and the minimum number of direction changes the fluid 18 encounters all contribute to less friction in the system and low energy losses thus allowing for the smaller, lower energy pump 72.

Upon further examination of the slots 54,60 one can see that the slots of the preferred embodiment are shaped to direct the fluid 18 along a surface of the housings 48,50 towards the center of the processing device 41. This allows for fresh processing fluid to be continuously applied to the film 10 as it travels through the processing device 41. Futhermore, the shape of the slots 54,60 prevents the fluid 18 from escaping through the entrance and exit ends 56,58 of the chamber 52 and contaminating the processing fluid in the adjacent sump tanks. Instead, the fluid 18 exhausts through an upper drain 80 in the upper applicator housing 48 and a lower drain 82 in the lower applicator housing 50. The upper and lower drains 80,82 each have a slit shaped orifice 84,86 to allow the upper and lower fluid layers to flow into the upper and lower drains 80,82 respectively. The slits 84,86 are proportioned so that the fluid pressure on the opposite sides of the film 10 remains equalized In the preferred embodiment slit 84 is wider than slit 86. Thus, the film 10 is prevented from being deflected from a straight line path as the film 10 travels through the chamber 52 as a result of equalized pressures on opposite sides of the film. Chutes 88,90 are located adjacent the drains 80,82 to guide the exhausted fluid 18 into the sump tank 20. The chutes 88,90 are constructed such that the chutes 88,90 are always filled with the fluid 18 thus creating a laminar fluid flow into the sump tank 20 and preventing aeration of the fluid 18 in the sump tank 20. Also, the chutes are constructed so that no back pressure into the chamber 52 is created.

In the present embodiment the fluid 18 is recirculated from the sump tank 20 to the upper tank 38 through the pump 72 and a conduit 76 having openings facing the bottom of the sump tank 20. The conduit 76 can be similar in construction to the conduit 68 in the upper tank 38. The construction of the conduit 76 should be such that it acts to reduce air vortices, sometimes referred to as air funnels, in the sump tank 20 caused by the suction of the pump 72, thus reducing aeration of the fluid 18 in the sump tank 20.

The fluid in the sump tank can be recirculated by conventional methods such as a batch process or a finite volume process which are not shown. The batch process is the method where a predetermined amount of fluid is supplied to the sump tank. The fluid is continuously recirculated until the fluid no longer provides a quality processed film or paper. The fluid is then dumped to a waste area and the sump tank is supplied with fresh fluid.

The finite volume process is a method where fluid is constantly added to the sump tank and constantly dumped from the sump tank. An overflow pipe is generally incorporated into the sump tank for allowing the finite volume of fluid to be expelled from the tank. Any conventional apparatus for replenishing the fluid can be used with the subject invention.

Referring to the drawings the operation of the photographic processing apparatus will be described.

The processing fluid 18 is supplied to the sump tank 20 associated with the photographic processing unit 12 using either the batch method of replenishing fluid or the finite volume method of replenishing fluid or other conventional method of recirculating fluid. The fluid 18 then flows from the sump tank 20 to the upper tank 38 by way of the conduit 76 in the sump tank 20, the pump 72 and the conduit 68 in the upper tank 38. The fluid is allowed to flow freely between the upper tank 38 and the lower tank 40. The fluid height sensor detects the predetermined height of the fluid 18 needed for photographically processing a particular photosensitive material and then regulates the pump 72 to regulate the flow of the fluid 18.

The film 10 is inserted into the photographic processing apparatus such that the nip rollers 34 grab the leading edge of the film 10 and guide the film 10 through the photographic processing unit 12.

The flowing fluid is now utilized to process the film 10 as the film 10 travels through the processing device 41. The fluid 18 flows into the chamber 52 through slots 54,60 to be applied to the film 10. The flowrate of the fluid provides the uniform turbulence and fluid shear rate desired to produce a photographically processed film or paper with sharp images and high contrasts. The fluid 18 is then exhausted through the drains 80,82 into the sump tank 20.

The nip rollers 36 guide the film to the next photographic processing unit 14. The nip rollers 36 also remove the excess fluid 18 from the film 10. The photographic processing units 14 and 16 operate in a similar fashion to the photographic processing unit 12.

It is now clear that through achieving and maintaining a uniform turbulent fluid flow on opposite sides of the photosensitive material the quality of the photosensitive material is greatly enhanced with the photographic processing apparatus embodying the present invention. Through utilization of the height of the fluid to create the uniform turbulent fluid flow the specifications of the pump are such that a lower energy pump is needed, thus a lower cost pump can be used with the photographic processing unit. Furthermore, the processing time is reduced.

In a second embodiment (not shown) of this invention a photographic processing unit can include a vessel for retaining a processing fluid. The processing unit further includes a processing device, similar in construction to the processing device of the preferred embodiment, such that the processing device is actually submersed in the fluid. The exit and entrance ends of the processing device are adjacent to an entrance slot and an exit slot incorporated in the vessel whereby a photosensitive material can travel therethrough for photographic processing. A uniform turbulent fluid flow is created and maintained similar to the turbulent fluid flow of the preferred embodiment. Other elements not discussed in connection with this embodiment but disclosed in connection with the preferred embodiment can be included in this embodiment. Furthermore, these elements can be similar in configuration to those discussed in connection with the preferred embodiment. A photosensitive material traveling through this photographic processing unit would be processed similar to that of the preferred embodiment.

In a third embodiment of the present invention a photographic processing unit is generally assembled from two parts. The first part would include an upper applicator housing, similar in construction to the upper applicator housing 48, which would be an integral part of an upper tank capable of retaining a processing fluid. The second part would include a lower applicator housing, similar in design to the lower applicator housing 50, which would be an integral part of the lower tank. The first and second parts would be assembled such that the fluid could flow freely between the first and second parts. Furthermore, the first and second parts would be assembled so that a fluid chamber is defined by the applicator housing portions of the first and second parts. A uniform turbulent fluid flow is created and maintained similar to the turbulent fluid flow of the preferred embodiment. This photographic processing unit further would include means for supplying the fluid to the vessel from a sump tank similar to those described previously in connection with the preferred embodiment. A photosensitive material traveling through this photographic processing unit would be processed similar to that of the preferred embodiment.

The present invention has been described in detail with particular reference to a preferred embodiment thereof, but it will be understood that variations and modifications can be effected within the spirit and scope of the invention.

We claim:

1. A photographic processing unit adapted to have a processing fluid supplied thereto for processing a strip or sheet of photosensitive material, said processing unit comprising:
   - a vessel for retaining the processing fluid;
   - a processing device having at least one inlet and adapted to be submersed in the fluid in said vessel, said processing device having means forming a chamber to permit the material to travel therethrough; and
   - means for supplying the processing fluid to said vessel to a predetermined height such that a predetermined fluid pressure is created at said inlet whereby fluid flows from said vessel to said chamber to create a turbulent fluid flow in said chamber for processing the photosensitive material as the material travels through said chamber.

2. A photographic processing unit as defined in claim 1 wherein said vessel includes an entrance slot and an exit slot for allowing the material to travel therethrough.

3. A photographic processing unit as defined in claim 2 wherein said chamber includes an entrance end and an exit end, said entrance and exit slots of said vessel being adjacent said entrance and exit ends of said chamber.

4. A photographic processing apparatus adapted to have a processing fluid supplied thereto for processing a strip or sheet of photosensitive material, the processing apparatus comprising:
   - a sump tank for retaining the processing fluid;
   - a vessel for receiving the processing fluid from said sump tank, said vessel having an entrance slot and an exit slot for allowing the material to travel therethrough;
   - a processing device having a first applicator housing and a second applicator housing defining an elongated fluid chamber therebetween for allowing the photosensitive material to travel therethrough, said fluid chamber having an entrance end and an exit end whereby said processing device is submersed in the fluid in said vessel such that said entrance and exit ends are adjacent said entrance and exit slots respectively;

means for supplying the fluid to a predetermined height in the vessel to create a predetermined fluid pressure on said processing device; having at least one opening for permitting the fluid to flow from said vessel into said fluid chamber to create a turbulent fluid flow on opposite sides of the material for processing the photosensitive material as the material travels through said fluid chamber.

5. A photographic processing apparatus as defined in claim 4 wherein said vessel comprises an upper tank having a first orifice and a lower tank having a second orifice whereby said processing device is intermediate said upper tank and said lower tank and said first orifice is proximate said second orifice such that the fluid flows freely between said upper tank and said lower tank.

6. A photographic processing apparatus as defined in claim 5 wherein said upper tank includes at least one slit for allowing the fluid to flow from said upper tank to said fluid chamber through said opening of said first applicator housing; and said lower tank includes at least one slit for allowing the fluid to flow from said lower tank to said fluid chamber through said opening of said second applicator housing.

7. A photographic processing apparatus as defined in claim 4 wherein said means for supplying the fluid includes a first conduit having a plurality of openings and adapted to be submersed in the fluid in said upper tank;

a second conduit having a plurality of openings and adapted to be submersed in the fluid in said sump tank; and a pump located between said first conduit and second conduit for supplying fluid from said sump tank to said upper tank.

* * * * *